Sept. 13, 1932. A. R. RHEINBERGER 1,877,591
GLOBE HANGER FOR LIGHTING FIXTURES
Filed Feb. 17, 1932 2 Sheets-Sheet 2
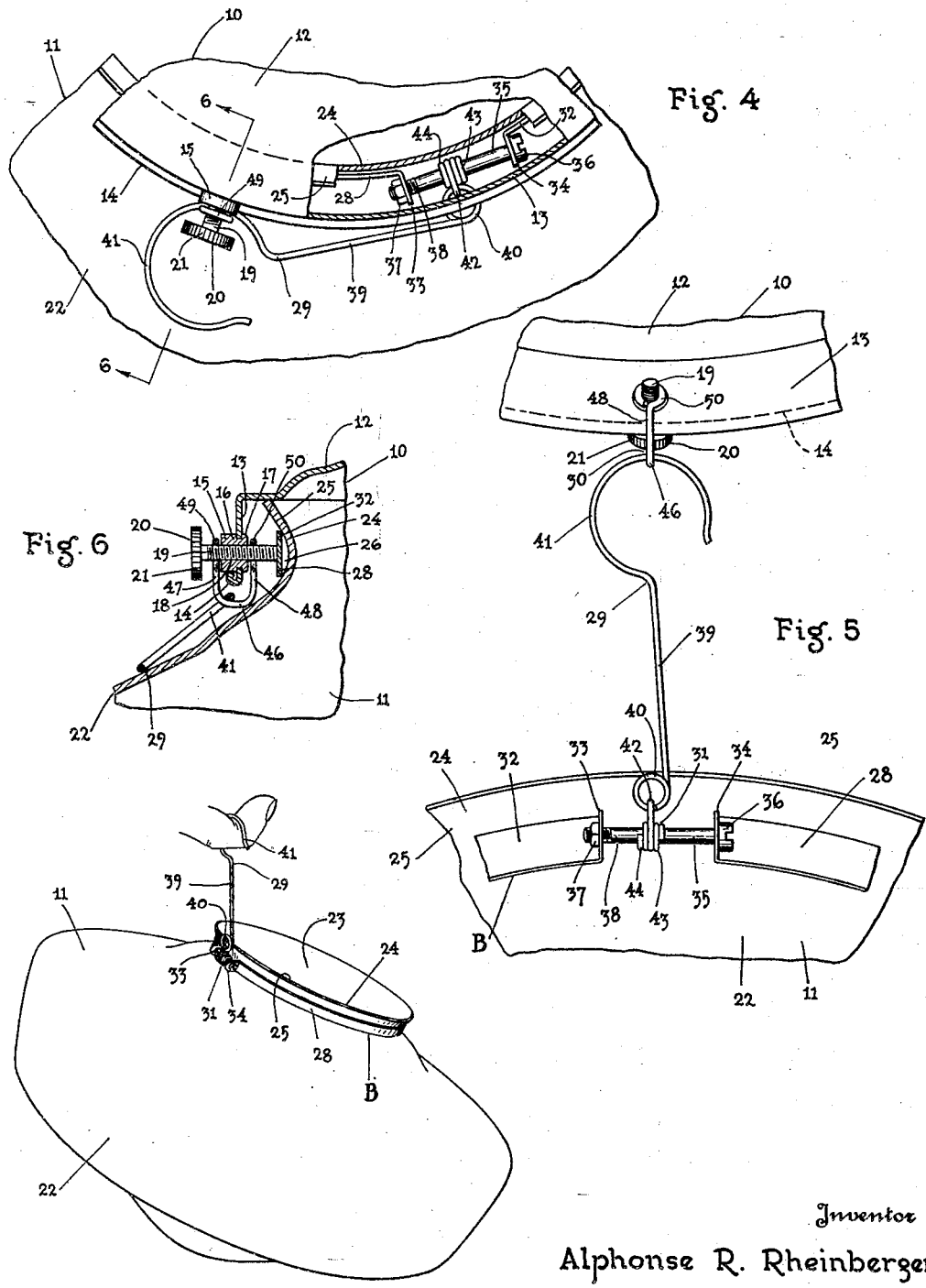
Inventor
Alphonse R. Rheinberger Patented Sept. 13, 1932

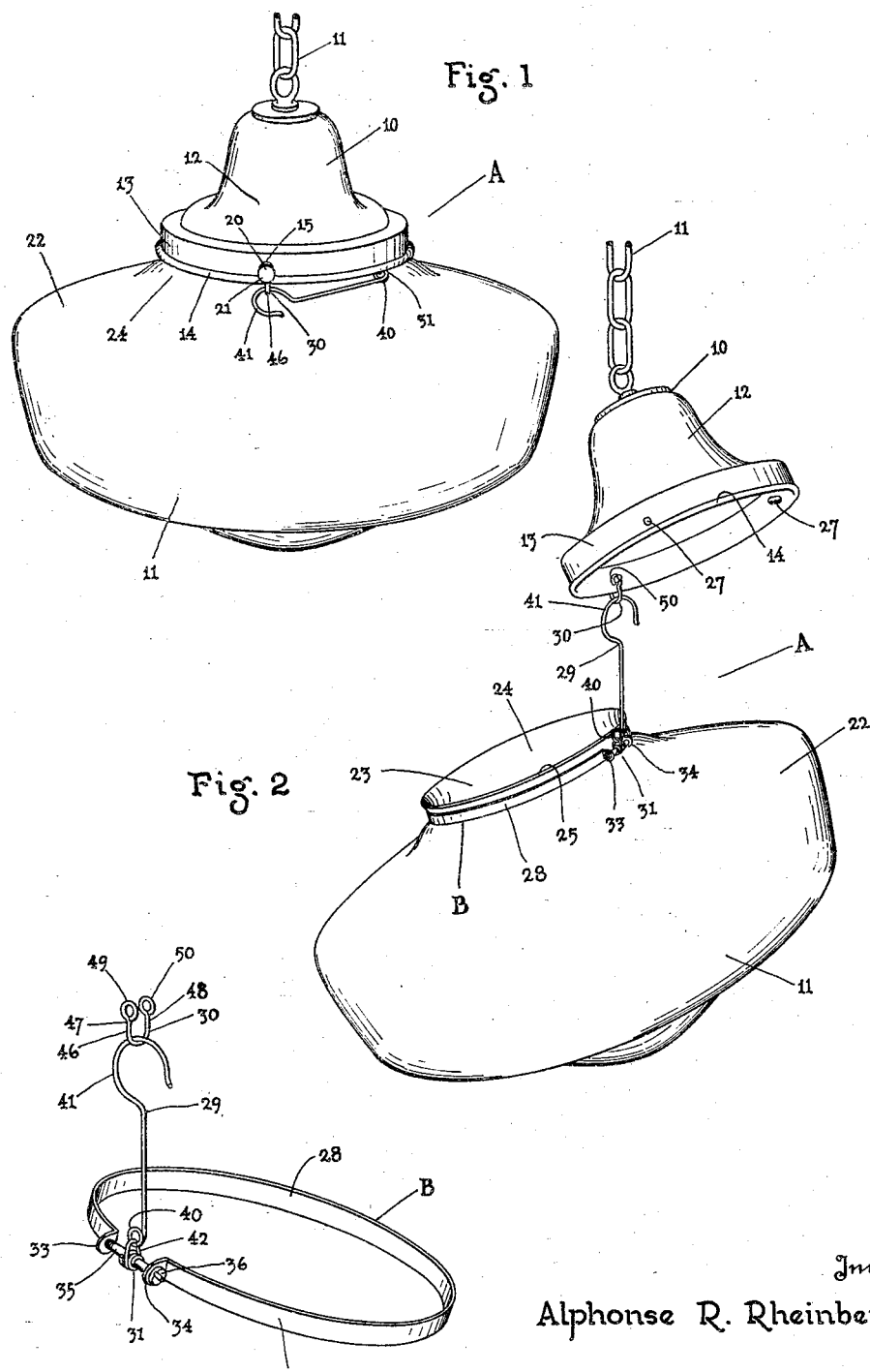

1,877,591

UNITED STATES PATENT OFFICE

ALPHONSE R. RHEINBERGER, OF ST. PAUL, MINNESOTA

GLOBE HANGER FOR LIGHTING FIXTURES

Application filed February 17, 1932. Serial No. 593,557.

My invention relates to globe hangers for lighting fixtures and has for its object to provide a hanger by means of which a globe may be temporarily held suspended from the globe holder when detached therefrom to permit of readily cleaning the same and inspecting and replacing the bulbs or other parts of the lighting fixture.

Another object of the invention resides in providing a tethering device connected to the globe and to the hanger.

An object of the invention resides in providing a device which may be readily applied to existing globe holders and globes without reconstruction thereof.

A feature of the invention resides in providing a hanger particularly adapted to globes formed with a neck having an outwardly turned lip to provide an annular groove thereabout and a hanger constructed with a flanged rim for the reception of the neck and means including a screw for engagement with said neck to hold the globe mounted within the holder.

Another object of the invention resides in providing a clevis adapted to be attached to the screw of the globe holder whereby the tethering device may be secured to the holder.

A still further object of the invention resides in constructing the tethering device with a link formed at one end with a hook adapted to be hooked into the clevis, said hook serving as a finger piece for supporting the globe when the same is completely removed from the globe holder.

An object of the invention resides in providing a band encircling the neck of the globe and lodged within the groove therein and in further providing a bolt for engagement with the ends of the band to secure the same in place about the neck.

Another object of the invention resides in providing a loop swiveled upon said bolt and in constructing said link with an eye linked with said loop.

A feature of the invention resides in turning said eye through an angle of 180° so as to cause the globe to rotate through a like angle when released from the holder, whereby both the globe and holder are readily accessible.

A feature of the invention resides in constructing said eye offset with respect to the shank of the link so as to cause the link to lie along the neck of the globe when the globe is attached to the holder.

Other objects of the invention reside in the details of construction thereof, and in the novel combination and arrangement of parts hereinafter illustrated or described.

In the drawings:

Fig. 1 is a perspective view of a globe attached to a globe holder and illustrating an embodiment of my invention applied thereto.

Fig. 2 is a perspective view of the globe and holder with the globe detached from the holder and suspended therefrom through my improved hanger.

Fig. 3 is a perspective view of the hanger detached from the globe and holder.

Fig. 4 is a fragmentary plan sectional view of the holder and globe with a part of the holder cut away to show the position of the hanger when the globe is attached to the holder.

Fig. 5 is an elevational view of a portion of the structure shown in Fig. 2.

Fig. 6 is a cross sectional view taken on line 6—6 of Fig. 4.

Fig. 7 is a perspective view of the globe attached from the globe holder and showing the method of using the finger piece.

In the cleaning of electric lighting fixture globes and in the inspection, removal and replacement of light bulbs and other parts of lighting fixtures, considerable inconvenience is at present encountered in supporting the globe after the same has been detached from the fixture to permit of performing the various operations desired. Where hangers have been used, the position of the parts is usually such that the globe and bulbs are more or less inaccessible. The present invention provides a hanger in which these various disadvantages have been overcome and which readily assist the attendant in performing his various duties.

For the purpose of illustrating the application of my invention, I have shown an ordinary electric lighting fixture which is indicated by the reference character A. Such lighting fixtures usually include a canopy which has not been illustrated and a globe holder 10 which is suspended from the canopy through a chain 111 or through any other suitable suspension. The globe holder 10 carries a globe 11 which is detachably secured thereto and which parts will now be described in detail.

The holder 10 is constructed with a spun body 12 formed with a cylindrical flanged rim 13 terminating at its free edge in a bead 14. This rim has secured to it intermediate its upper and lower edges a bushing 15 (Fig. 6) which is formed with a shoulder 16 disposed on one side of the rim 13 and with a turned-over edge 17 by means of which said bushing is securely riveted to the flange proper. The bushing 15 is internally threaded as indicated at 18 to receive the threaded shank 19 of a thumb screw 20. This thumb screw is provided with a knurled head 21 through which the same may be rotated and by means of which the screw may be moved in a radial direction. Cooperating with the screw 20 are a number of lugs 27 which have not been shown in detail, but which are attached to the rim 13 and extend inwardly of the same in a position to engage the globe proper, as will be presently described in detail.

The globe 11 consists of a body portion 22 which is open at one end as indicated at 23, and which is formed with a neck 24 encircling the open end thereof. The neck 24 is constructed with an outwardly turned lip 25 which provides an annular groove 26 extending circumferentially about said neck. The groove 26 is constructed concave as shown, which construction is utilized in a manner to be presently described in detail.

In the ordinary use of the fixture the screw 21 is loosened and the globe applied to the holder 12 by inserting the neck 24 into said holder in such a manner that the lugs 27 are received within the groove 26. Screw 20 is then turned until the same engages the neck 24 which holds the globe properly attached to the holder. Upon loosening of the screw 20 the globe becomes completely detached from the holder and when so detached, brings about the previously described disadvantages which the present invention overcomes.

The invention proper consists of a hanger indicated in its entirety, in Fig. 3, by the reference character B. This hanger comprises a band 28 encircling the neck of the globe 11, a link 29 and fastening means indicated at 30 and 31 for securing the link to the band 28 and to the holder proper. These parts will now be described in detail.

The band 28 is constructed from a thin flexible strip of metal 32 which is somewhat shorter than the girth of the neck 24 and which is provided at its ends with out-turned ears 33 and 34. These ears are drilled to receive a bolt 35 having a head 36 engaging the ear 34 and a nut 37 screwed upon the threaded shank 38 of said bolt. In applying the hanger to the globe, the band 28 is placed about the neck and the bolt 35 inserted through the two ears 33 and 34, the nut 37 applied and screwed up to hold the band properly attached to said neck. When so disposed the band 28 seats against the neck proper at its edges and becomes spaced from the said neck along the concave groove 26 thereof as will be noted in Fig. 6. The band is preferably constructed in this manner so that when the screw 20 is screwed against the same, said band can yield and prevent undue pressure being inserted upon the globe proper, thereby protecting the same and preventing breaking thereof from expansion caused through heat from the light bulb used with the fixture.

The link 29 is shown in detail in Fig. 5 and comprises a straight shank 39 which is formed at one end with an eye 40 and at its other end with an open hook 41. The eye 40 is attached to the band 28 through the fastening device 31, while the hook 41 is attachable to the fastening device 30 as will be presently described. The hook 41 also forms a finger piece by means of which the globe may be manipulated when completely detached from the globe holder.

The fastening device 31 is best shown in Figs. 4 and 5. This device consists of a loop 42 which is swivelly mounted upon the shank 38 of bolt 35. This loop is preferably constructed of wire and is provided with convolutions 43 and 44 encircling the shank 38 of said bolt by means of which the said loop is rotatably mounted on said bolt. Loop 42 lies in a plane at right angles to the axis of bolt 35 and the same may be slid upon said bolt as well as rotated with respect thereto. The eye 40 is linked in the loop 42 which provides a loose flexible connection between link 29 and the band 28, whereby appreciable movement of the link 29 may be had.

The fastening device 30 consists of a clevis 46 which is preferably bent of wire or which may be constructed as a stamping, if desired. This clevis is formed with two arms 47 and 48 which are adapted to straddle the rim 13 of the globe holder 12. These arms terminate at their free ends in eyes 49 and 50 which are adapted to receive the screw 20 and by means of which the said clevis is pivotally mounted on the globe holder and held in proper position relative thereto. The hook 41 of the link 29 is adapted to be hooked into the clevis 46 as shown in Fig. 2 so as to suspend the globe from the holder 12 when the globe is detached from the flanged rim 13 thereof.

The link 29 is secured to the loop 32 in such a manner that while hooked in the clevis 46 it may lie upon the upper surface of the globe 22 as shown in Fig. 4 and extend away from the neck 24. This is accomplished by making the eye 40 offset with respect to the shank 39 of said link so that said shank becomes spaced from the neck 24 when resting on the globe 11. To bring the parts in proper relation when the globe is detached from the holder the link 29 is given a turn of 180° with respect to the fastening device 31 so that when the screw 20 is loosened and the globe disengaged from the holder 12, said globe is caused to rotate through a corresponding angle and to assume the position with reference to said holder shown in Fig. 2. In this position both the interior of the globe and the exposed part of the holder 12 are fully visible and exposed giving ready access to both of the same without change in position thereof.

In the use of the device, the parts are assembled as shown in the drawings with the hook 41 properly applied to the clevis 46. When in such position the link 29 may be laid upon the globe and the globe attached to the holder 12 as shown in Fig. 1. Thereafter screw 20 is tightened up until it engages the band 28 which holds the globe attached to the holder. Whenever it becomes desirous to disconnect the globe, it is merely necessary to unscrew the screw 20. When sufficiently unscrewed the globe drops from the holder and becomes suspended through the hanger proper occupying the position shown in Fig. 2. If at any time it be desired to remove the globe completely, the same may be accomplished, by unhooking the link 29 from clevis 46. Thereafter the hook 41 may be utilized as a finger piece, for use in handling the globe. In applying the globe to the holder, the link 29 is first given a twist of 180° and then applied to the clevis 46. The globe may then be brought toward the holder and the link moved into position shown in Fig. 4, after which the globe may be attached as previously described.

My invention is highly advantageous in that it provides an extremely simple and effective device by means of which the globe may be hung from the globe holder while the globe and fixture are cleaned or while the bulbs of the fixture are being replaced. The device is applicable to existing lighting fixtures without reconstruction and can be easily applied to various sizes of fixtures. The link employed forms a convenient means for use in handling the globe, preventing danger of breakage of the globe through slippage, as frequently occurs in the washing of the globes due to the condition of the hands of the person handling the same. The invention can be constructed at a nominal cost. The device is easily and quickly applied and will not readily get out of order. The parts are so constructed as to prevent accidental disengagement, thereby making the device practically fool proof.

Changes in the specific form of my invention, as herein disclosed, may be made within the scope of what is claimed without departing from the spirit of my invention.

Having described my invention, what I claim as new and desire to protect by Letters Patent is:

1. In combination with a globe having a neck and a globe holder therefor, having a flanged rim for the reception of said neck, and a thumb screw for clamping said holder upon said neck, means attached to said screw and connected to said globe for supporting said globe in detached position with respect to said globe holder.

2. In combination with a globe having a neck and a globe holder therefor, having a flanged rim for the reception of said neck, and a thumb screw for clamping said holder upon said neck, a link connected to said screw and to the neck of the globe for holding and supporting said globe in detached position with respect to said globe holder.

3. In combination with a globe having a neck and a globe holder therefor, having a flanged rim for the reception of said neck, and a thumb screw for clamping said holder upon said neck, fastening means secured to the neck of the globe, other fastening means secured to said globe holder and a link linked to both of said fastening means for supporting said globe in detached position with respect to said globe holder, said link being swingable through said fastening means to move into a position along said neck upon attachment of the globe to the globe holder.

4. In combination with a globe having a neck and a globe holder therefor having a flanged rim for the reception of said neck, and a thumb screw for clamping said holder upon said neck, fastening means secured to the neck, a link linked at one end with said fastening means and formed at its other end with a hook, and fastening means on said globe holder, said hook being detachably secured to said second named fastening means and providing a finger piece for holding the globe when the hook is detached from said last named fastening means.

5. In combination with a globe having a neck and a globe holder therefor having a flanged rim for the reception of said neck, and a thumb screw for clamping said holder upon said neck, fastening means secured to the neck, a link linked at one end with said fastening means and formed at its other end with a hook, a clevis straddling the rim of said globe holder and having eyes on either side of said rim through which said thumb screw extends, said hook being engageable with said clevis to detachably support the globe from the globe holder when the same is disengaged therefrom.

6. In combination with a globe having a neck formed with an outwardly extending lip to provide an annular groove thereabout, a globe holder having a flanged rim for the reception of said neck, and fastening means engaging said lip to hold the globe attached to said globe holder, a band encircling said rim and lodged within said groove, means for securing the ends of said band together to clamp it about the groove and a link connected to said band and to said holder for supporting the globe when detached from the holder.

7. In combination with a globe having a neck formed with an outwardly extending lip to provide an annular groove thereabout, a globe holder having a flanged rim for the reception of said neck, and fastening means engaging said lip to hold the globe attached to said globe holder, a band encircling said rim and lodged within said groove, said band having outwardly extending ears, a bolt passing through said ears, a loop swiveled on said bolt and a link connected to said loop and to said globe holder.

8. In combination with a globe having a neck formed with an outwardly extending lip to provide an annular groove thereabout, a globe holder having a flanged rim for the reception of said neck, and fastening means engaging said lip to hold the globe attached to said globe holder, a band encircling said rim and lodged within said groove, means for securing the ends of said band together to clamp the same within the groove on said neck and a loop swiveled to swing about an axis tangent to said neck, and a link connected to said loop and to said holder.

9. In combination with a globe having a neck formed with an outwardly extending lip to provide an annular groove thereabout, a globe holder having a flanged rim for the reception of said neck, and fastening means engaging said lip to hold the globe attached to said globe holder, a band encircling said rim and lodged within said groove, means for securing the ends of said band together to clamp the same within the groove on said neck, a loop swiveled to swing about an axis tangent to said neck, and a link having an eye linked with said loop and turned through an angle of 180°, said link being connected to said holder, the link being foldable to lie along the neck of the globe when the globe is attached to the globe holder and to turn said globe through an angle of 180° when the globe is detached from the globe holder to bring the parts of the globe and holder in readily accessible position.

10. In combination with a globe having a neck formed with an outwardly extending lip to provide an annular groove thereabout, a globe holder having a flanged rim for the reception of said neck, and fastening means engaging said lip to hold the globe attached to said globe holder, a band encircling said rim and lodged within said groove, means for securing the ends of said band together to clamp the same within the groove on said neck, a loop swiveled to swing about an axis tangent to said neck, and a link connected to said loop and to said holder, said link having a shank and an eye on one end thereof offset with respect thereto and linked in said loop, said link being connected to the globe holder and being adapted upon attachment of the globe to the globe holder to lie in spaced relation to the neck of said globe and along the same.

11. In combination with a globe having a neck formed with an outwardly extending lip to provide an annular groove thereabout, a globe holder having a flanged rim for the reception of said neck, a thumb screw in said rim movable toward and from the groove in said neck, a band encircling said neck and lodged within said groove, said screw engaging said band, and tethering means connected to said band and to said globe holder.

12. In combination with a globe having a neck formed with an outwardly extending lip to provide an annular concave groove thereabout and a globe holder having a flanged rim for the reception of said neck, a screw extending through said rim and movable toward and from said groove, a band encircling said neck and lodged within said groove, said band being spaced from the groove along the concavity thereof, tethering means secured to said band and to said globe holder, said screw being adapted to engage said band and to force the same into the concavity of said groove.

In testimony whereof I affix my signature.

ALPHONSE R. RHEINBERGER.